(12) United States Patent
Cross et al.

(10) Patent No.: US 9,208,471 B2
(45) Date of Patent: Dec. 8, 2015

(54) MATCHING USERS WITH SIMILAR INTERESTS

(75) Inventors: Adam Cross, San Francisco, CA (US); Michael Effle, Antioch, CA (US); Chuck Kao, Dublin, CA (US); Gregory Charles McNutt, Sunnyvale, CA (US)

(73) Assignee: Alibaba.com Limited (KY)

( * ) Notice: Subject to any disclaimer, the term of this patent is extended or adjusted under 35 U.S.C. 154(b) by 6 days.

(21) Appl. No.: 13/529,878

(22) Filed: Jun. 21, 2012

(65) Prior Publication Data

US 2012/0331055 A1 Dec. 27, 2012

Related U.S. Application Data

(60) Provisional application No. 61/501,128, filed on Jun. 24, 2011, provisional application No. 61/501,129, filed on Jun. 24, 2011.

(51) Int. Cl.
*G06F 15/16* (2006.01)
*G06Q 10/10* (2012.01)
*G06Q 50/00* (2012.01)

(52) U.S. Cl.
CPC ............. *G06Q 10/10* (2013.01); *G06Q 50/01* (2013.01)

(58) Field of Classification Search
CPC ......... G06F 15/16; G06F 17/03; G06Q 10/10; H04L 29/08

USPC .......................................................... 709/204
See application file for complete search history.

(56) References Cited

U.S. PATENT DOCUMENTS

| | | | |
|---|---|---|---|
| 4,559,597 A | 12/1985 | Mullani | |
| 6,266,649 B1 | 7/2001 | Linden et al. | |
| 8,214,375 B2 | 7/2012 | Fitzmaurice et al. | |
| 8,275,384 B2 | 9/2012 | Das et al. | |
| 8,423,542 B2 | 4/2013 | Moon et al. | |
| 2002/0059399 A1 | 5/2002 | Learmonth | |
| 2003/0033179 A1* | 2/2003 | Katz et al. | 705/7 |
| 2004/0172267 A1 | 9/2004 | Patel et al. | |
| 2008/0005072 A1 | 1/2008 | Meek et al. | |
| 2009/0199230 A1* | 8/2009 | Kumar et al. | 725/32 |
| 2009/0287685 A1* | 11/2009 | Charnock et al. | 707/5 |
| 2010/0312724 A1* | 12/2010 | Pinckney et al. | 706/11 |
| 2011/0029382 A1 | 2/2011 | Narasimhan et al. | |
| 2012/0254246 A1* | 10/2012 | Kerger et al. | 707/780 |

* cited by examiner

*Primary Examiner* — David X Yi
*Assistant Examiner* — Sibte Bukhari
(74) *Attorney, Agent, or Firm* — Van Pelt, Yi & James LLP

(57) ABSTRACT

Matching users with similar interests is disclosed, including: obtaining, from an external source, items of interest as indicated by a plurality of users; storing information about the plurality of users and their respective items of interest; and identifying, for a first user of the plurality of users, a set of similar users who have overlapping interests as the first user, wherein the overlapping interests are determined based at least in part on items of interest to the first user and items of interest to the plurality of users.

21 Claims, 11 Drawing Sheets socialflavor beta

We have imported 64 of your likes from Facebook
Click on any items you wish to exclude.    [Next]

Books
- Bleak House
- Built to Last: Successful Habits
- Good to Great
- Jane Eyre
- Mansfield Park
- Tess of the d'Urbervilles
- The Davinci Code
- The God Delusion
- The Moral Animal

Businesses
- simple shoes

Food & Drink
- Guinness

Movies
- 300
- Appleseed
- Batman Begins
- Batman: The Dark Knight
- Black Hawk Down
- Crouching Tiger, Hidden Dragon
- Death Note
- First of Legend
- Flash Point
- Harry Potter and the Deathly
- Ichi
- Ip Man

| Items | Users |
|---|---|
| Item 1 | User 1, User 3 |
| Item 2 | User 1, User 3 |
| Item 3 | User 1 |
| Item 4 | User 2 |
| Item 5 | User 3 |
| Item 6 | User 1, User 2 |
| Item 7 | User 2, User 3 |
| Item 8 | User 1 |
| ... | ... |
| Item 11 | User 1, User 3 |

MATCHING USERS WITH SIMILAR INTERESTS

CROSS REFERENCE TO OTHER APPLICATIONS

This application claims priority to U.S. Provisional Patent Application No. 61/501,128 entitled MATCHING USERS WITH SIMILAR INTERESTS filed Jun. 24, 2011 which is incorporated herein by reference for all purposes; and claims priority to U.S. Provisional Patent Application No. 61/501,129 entitled SIMILARITY MATCHING OF USERS filed Jun. 24, 2011 which is incorporated herein by reference for all purposes

BACKGROUND OF THE INVENTION

Today, Internet users have many opportunities to express their interests and maintain records of such interests. Social networking/Web 2.0 sites often provide ways for users to share content, such as via the Facebook® "Like" button, Amazon® product reviews, Netflix® movie reviews, etc. Typically, a website allows its users to access shared content recommended by other users in that same social network.

BRIEF DESCRIPTION OF THE DRAWINGS

Various embodiments of the invention are disclosed in the following detailed description and the accompanying drawings.

FIG. 5 shows an example of items imported for a user.

FIG. 9 is an example of an item-user database that maps each item to a list of users who have indicated interest in the item.

DETAILED DESCRIPTION

Figure 1:
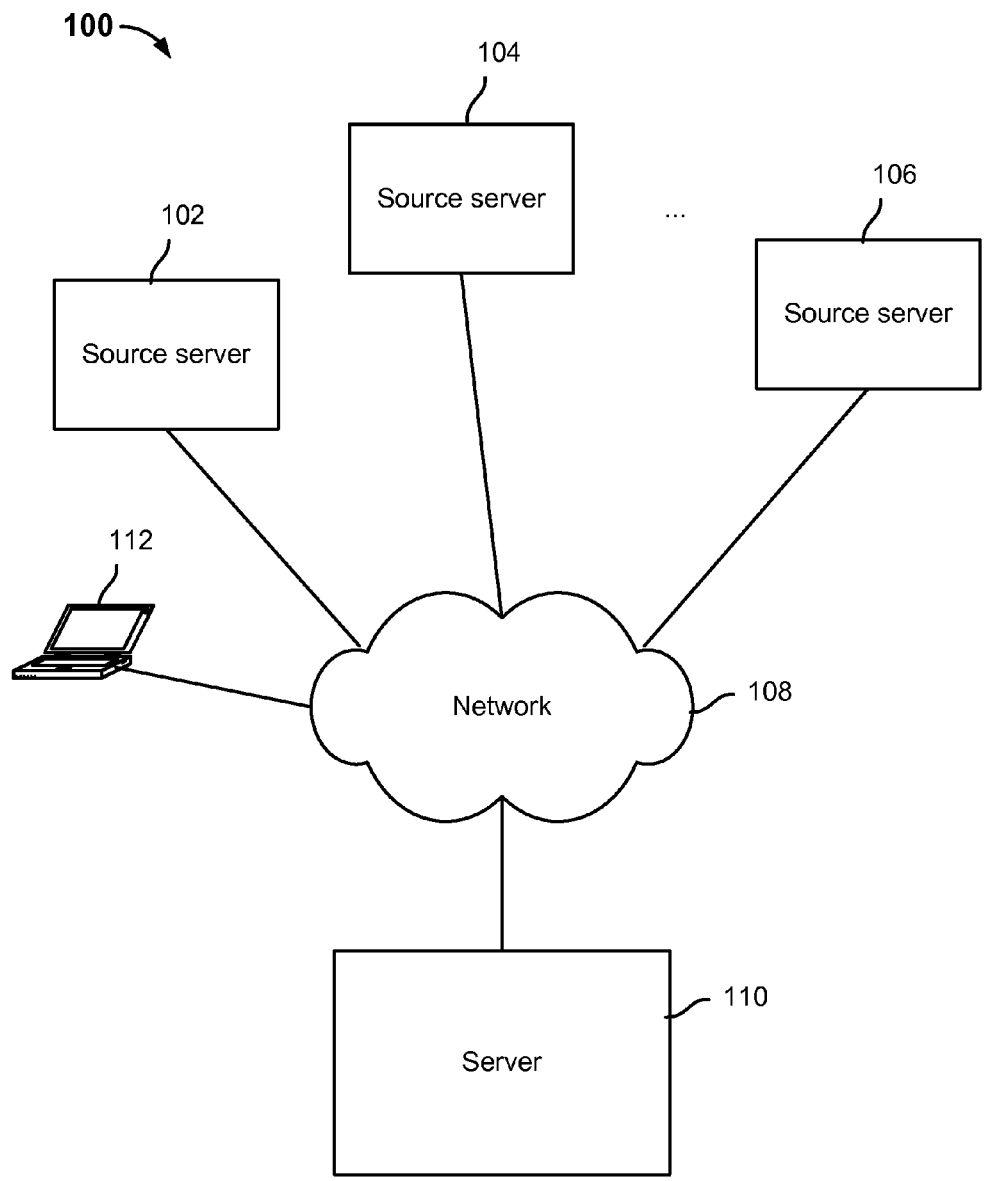
FIG. 1 is a diagram showing an embodiment of a system for matching users with similar interests.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of a social networking platform that allows users to identify other users with similar interest/taste based on items of interest collected from various external sources and thereby further discover/explore items of potential interest are described herein. Examples of items of interest may include, but is not limited to, products, movies, books, music, public figures, activities, and locations. For example, a user may have respective accounts at various external sources (e.g., Facebook®, Yelp®) and has indicated at each external source one or more items of interest (e.g., by providing a positive feedback with respect to an item/place). The user's items of interest from the various external sources may be imported into a profile for the user at the platform for matching users with similar interests and the platform may compare the user's items of interest across the external sources against those imported items of interests of other users to determine which other users have similar items of interest to the user. In some embodiments, the most similar one or more other users (i.e., users with the most amount of overlapping items of interest as the user) are identified for the user. The user may then, for example, interact with these other users and/or their profiles at the platform to discover other items of possible interest to the user. An example implementation, the Social-flavor platform, is discussed for purposes of example.

FIG. 1 is a diagram showing an embodiment of a system for matching users with similar interests. In the example, system 100 includes source server 102, source server 104, source server 106, network 108, client 112, and server 110. Network 108 may include high-speed data and/or telecommunication networks. While source servers 102, 104, and 106 are shown in the example, system 100 may include fewer or more source servers.

Each of source servers 102, 104, and 106 may host a different website (e.g., a different social media website) at which a user may register a separate account. For example, by virtue of registering an account at a website hosted by one of source servers 102, 104, and 106, the user may receive authentication information (e.g., login identity, password, certificate) to access his or her account at the website and also store one or more selections/preferences for items of interests at the website. For example, in association with an account at a website, a user may be able to maintain a profile about himself or herself, at which the user may share personal information and/or items of interest such as movie titles, song titles, descriptions of activities, names of restaurants, names of travel sites, etc. In some cases, each of source servers 102, 104, and 106 may be associated with at least some different/ non-overlapping specializations with particular categories of items of interest. For example, one source server may be associated with sharing items that are primarily book titles while another source server may be associated with sharing items that are primarily song titles. A user may use a device such as client 112 to access websites hosted by source servers 102, 104, and 106 using an installed web browser application. While client 112 is shown to be a laptop computer, other examples of client 112 may include a desktop computer, a smart phone, a mobile device, a tablet device, or any computing device.

However, by creating separate accounts at source servers 102, 104, and 106, the user may need to create and keep track of separate profiles at each of source servers 102, 104, and 106. Examples of websites hosted by source servers 102, 104, and 106 include Facebook®, Yelp®, Amazon.com®, Spotify®, and Netflix®. As a result, the user may need to perform duplicative activities at each of source servers 102, 104, and 106. For example, the user may need to provide at least some of the same personal information to each different profile. Furthermore, if the websites are each associated with slightly different categories of items of interest, the user may need to update his or own interests at each of the respective websites, sometimes repetitively if some of the same categories/items of interest are available for the user to indicate a preference at two or more of the websites.

Server 110 is configured to communicate with client 112, source servers 102, 104, and 106 over network 108. Server 110 is configured to host a social networking platform that imports and aggregates users' items of interest as indicated at one or more websites hosted by source servers 102, 104, and/or 106 and also to match users at the platform with other similar users based on their items of interest. Server 110 is configured to provide a user interface at which a user (e.g., a user using client 112) may provide logon and/or credential information associated with the user's respective accounts at the websites hosted by source servers 102, 104, and 106. For example, the user may access the user interface using a web browser and entering a URL associated with the social networking platform hosted by server 110. Server 110 is configured to logon, receive consent and/or provide the user's credential information to the websites respectively hosted by source servers 102, 104, and 106 to import the items of interest that were indicated by the user. For example, if the user had indicated movie titles that he or she is interested in at the website provided by source server 102, song titles that he or she is interested in at the website provided by source server 104, and activity descriptions that he or she is interested in at the website provided by source server 106, then the movie titles, song titles, and activity descriptions would be imported and aggregated at a profile created for the user at the platform provided by server 110. In some embodiments, server 110 is configured to provide deduplication with respect to the items of interest imported from the various websites provided by source servers 102, 104, and 106 so that there would only be one entry at the platform provided by server 110 for an item of interest that may have been indicated by the user at more than one website. In some embodiments, server 110 is configured to periodically check for updated, modified, and/or items of interest indicated at source servers 102, 104, and 106 to import or use to update previously imported items of interests for users.

Server 110 is further configured to determine for a first user at the platform provided by server 110, other users that share at least some of the same items of interest as the first user. In some embodiments, another user that is found to have at least one overlapping item of interest as the first user is referred to as a matching user. For example, such a matching process may be initiated by a matching request issued by or on behalf of the first user. In some embodiments, for the first user, server 110 is configured to determine other users with the most number of overlapping items of interest as the first user. For example, the server 110 may be configured to determine the top N number of other users with the most number of overlapping interests as a given user. In some embodiments, server 110 is configured to present to the first user identifiers associated with those other users determined to have the most number of overlapping interests as the first user. For example, the first user may desire to browse the respective profiles associated with these matching users to discover other items of interest of those users that the first user may be interested in and/or the first user may wish to send a message to these other users to discuss their common interests.

Figure 2:
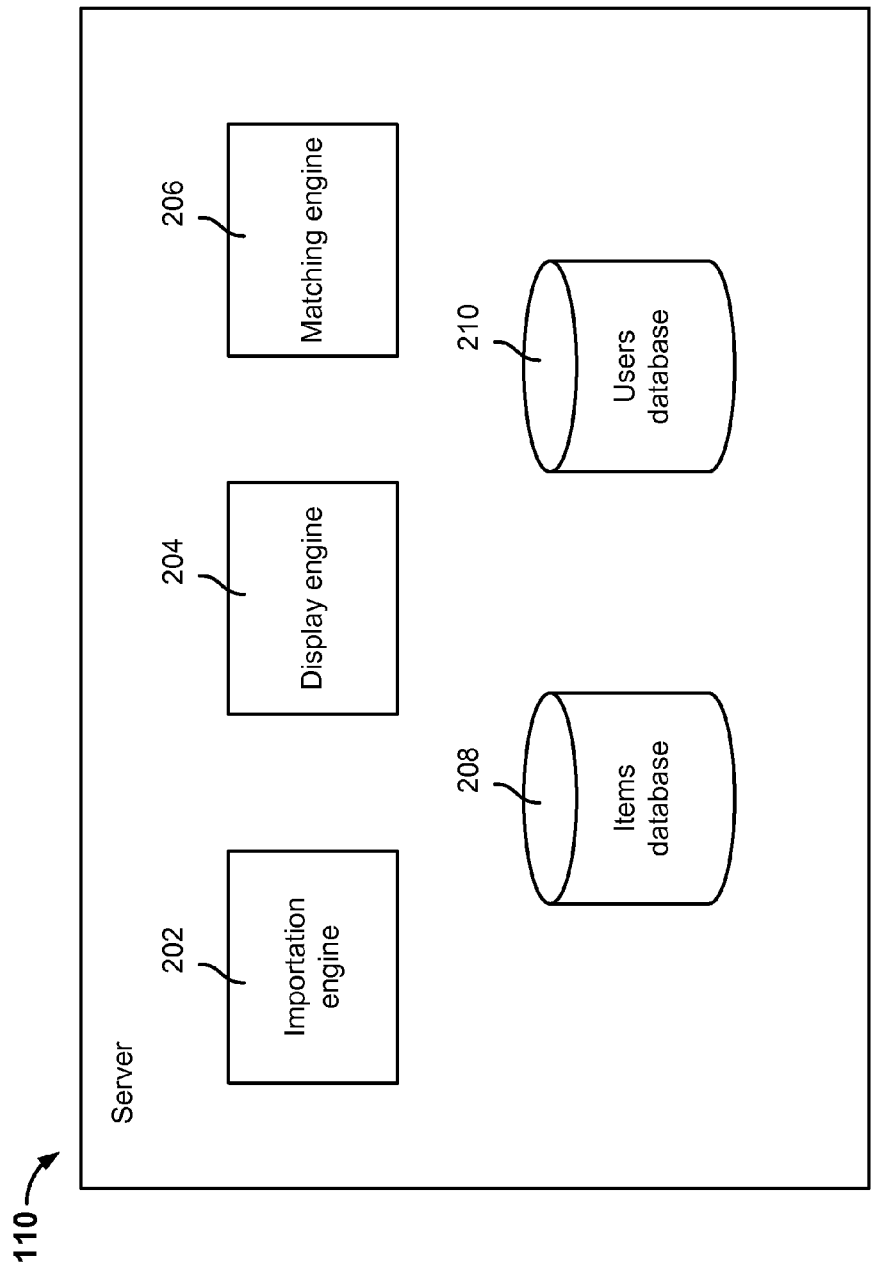
FIG. 2 is a diagram showing an embodiment of a server.

FIG. 2 is a diagram showing an embodiment of a server. In some embodiments, server 110 may be implemented using the example of FIG. 2. In the example, the server includes importation engine 202, display engine 204, matching engine 206, items database 208, and users database 210.

Importation engine 202 is configured to import items of interest from one or more external sources. In some embodiments, external sources refer to other servers that store item of interest information for one or more users. For example, an external source may be a server that supports a website at which users may indicate interests of items from one or more categories. For example, the social networking website Facebook® may be such an external source and those items (e.g., movies, songs, books) that a user "Likes" on the Facebook® website may be deemed as items of interest for the user. In some embodiments, importation engine 202 is configured to present a user interface at which a user may input the user's logon (e.g., logon identifier, password) and/or credential information for each of one or more external sources. Importation engine 202 then stores such logon and/or credential information and uses it to access the user's respective accounts at the one or more external sources so as to obtain the privilege to obtain the user's items of interest from each of the one or more external sources. In some embodiments, an item of interest obtained by importation engine 202 is a title and/or description (e.g., movie, book, song, activity). In some embodiments, importation engine 202 is configured to categorize each imported item of interest into at least one category recognized by importation engine 202.

In some embodiments, logic is stored at importation engine 202 that enables importation engine 202 to identify which items at an external source a user may have merely interacted with and which items the user actually has an interest in. For example, some external sources such as Facebook® allow users to indicate feedback such as which items they "Like," and such items can be deemed as items of interest, and some other external sources such as Netflix® allow users to indicate feedback as a rating on a scale of five stars (one star being the lowest and five stars being the highest). In this example, logic stored at importation engine 202 may dictate that only movies at Netflix® that are rated by a user as being of three stars or higher are imported as items of interest, whereas other movies that the user has merely watched but not rated or rated one or two stars are ignored and not imported as items of interest.

In some embodiments, importation engine 202 is configured to store the imported items of interest at items database 208. In some embodiments, importation engine 202 is configured to store only unique items of interest at items database 208 such that new entries at items database 208 may only be stored for new items of interest (e.g., items of interest for which a user has indicated at an external source for the first time among the users that have accounts with a server such as server 110) and importation engine 202 stores only references to existing entries for the not new items of interest (e.g., items of interest for which at least one other user has previously indicated at an external source). In some embodiments, logic is stored at importation engine 202 that enables importation engine 202 to recognize the same item of interest across two or more different external sources despite descriptions of the item being potentially stored in different formats at each of the external sources, such that importation engine 202 does not create multiple entries at items database 208 for one unique item of interest. For example, items database 208 may have one entry for the movie title "The Matrix" regardless of the fact that it is a movie title that is available to be indicated as an item of interest at both external sources of Netflix® and Facebook®. In some embodiments, importation engine 202 is configured to import media associated with each unique item to be stored at items database 208. For example, associated media for a unique item of interest may be text and/or drawings that describe the item in addition to an identifier for the item. For example, associated media may include a text description and/or related image. For example, for the item of the movie "The Matrix," a text-based summary of the movie as well as an image of the movie poster may be imported for the item and stored with the item at items database 208. In some embodiments, importation engine 202 may import the associated media of an item from an external source from which the item was imported and/or a third party source (e.g., Wikipedia®).

In some embodiments, importation engine 202 is configured to store the set of items of interest imported for each user at users database 210. In some embodiments, importation engine 202 is configured to deduplicate items of interest imported from two or more different external sources for a user such that the same item of interest indicated by the user at multiple external sources are not designated as multiple different items of interest. For example, the item of the music band Muse® that is indicated by the user Alice as being of interest at the external sources of Facebook® and Spotify® appears as only one item among the set of items of interest stored for the user Alice at users database 210.

Display engine 204 is configured to present a profile for each user including at least the user's imported items of interest and/or other added items of interested (e.g., items that are indicated by the user as being of interest at the platform or are otherwise not imported from a different website). In some embodiments, display engine 204 is configured to present a user's items of interest at one or more granularities. For example, display engine 204 may present icons/images corresponding to one or more categories of items of interest for a user and in response to a user selection of a particular category of items of interest, display engine 204 may present icons/images corresponding to the items under that selected category. For example, display engine 204 may present items of interest from one or more categories together (e.g., at one webpage), where each category is presented in text and/or by a corresponding icon/image and the text, icons, and/or images corresponding to the items under that category are presented below it. In some embodiments, display engine 204 is configured to present a similar display of items of interest in a profile to the user associated with that profile and another user who is not associated with the profile. In some embodiments, display engine 204 is configured to present a different display of items of interest in a profile to the user associated with that profile versus another user who is not associated with the profile by, for example, showing fewer details for the presented items to the other user. In some embodiments, in addition to items of interest, display engine 204 is configured to present in a user profile other information such as, for example, identifying information associated with the user (e.g., name), the number of other users at the platform that the user is following, and the number of other users at the platform that follows the user. In some embodiments, "following," "follows," or "is followed by" (among other variants of "follow") refers to a user having a platform-recognized relationship to another user at the platform such that a first user that "follows" a second user may gain access to the second user's profile and/or be informed of new platform-related activities performed by the second user (e.g., the addition of more items of interest to the second user's profile). In some embodiments, display engine 204 is configured to present a second user's profile to a first user who is currently logged on to the platform whether the first user follows or does not follow the second user, depending on the privacy settings configured by the first user.

Matching engine 206 is configured to find other users who have similar items of interest as a first user. Each user that has at least one item of interest as the first user is referred to as a "matching user," herein. In some embodiments, matching engine 206 is configured to receive a request associated with finding one or more other users that share the most number of similar items of interest as a first user. In some embodiments, matching engine 206 is configured to access items database 208 and/or users database 210 to determine which other users share similar items of interest as the first user and how many overlapping items there are between each other user and the first user. Then, the other users that are found to have overlapping items with the first user are ranked by their respective numbers of overlapping items. In some embodiments, for each matching user, each additional overlapping item with the first user increments the count associated with the user by 1 and the total number of overlapping items is represented by the count associated with that other user. In some embodiments, matching engine 206 is configured to determine N number of other users that are determined to be the most similar as the first user (e.g., have the most number of overlapping items of interest as the first user), where N may be a predetermined integer or a value input by the first user. In some embodiments, identifiers associated with at least some of the matching users are presented to the first user so that the first user may select to view one or more of those other user's profiles and/or follow one or more of those other users. In some embodiments, instead of relying on just the number of overlapping items, each matching user receives a weighted score. The factors affecting the score include the matching user's social credibility (measured by, for example, whether the user has made contributions to the platform recently, and how often the user has contributed, whether the user is endorsed by other users, etc.), whether the matching user is already in the first user's network, etc. For example, the count associated with a matching user may be multiplied by the weighted score and this weighted count may be compared against those of other users to determine which users are the most similar (e.g., the users with the greatest weighted counts are determined to be the most similar). This way, a user who has low credibility (i.e., new to the system) but has indicated an interest in a large number of items and therefore has a lower weighted score will not likely emerge as one of the more similar users to the first user that requested the matching process.

Items database 208 is configured to store items indicated to be of interest to one or more users at the platform. In some embodiments, each item is stored with an identifier, accompanying description, and/or category. In some embodiments, only one entry exists for each unique item. In some embodiments, each item is also stored with mappings (e.g., references) to the users (e.g., whose information is stored at users database 210) that have indicated interest in that item (e.g., at the platform or an external source website).

Users database 210 is configured to store users with registered accounts at the platform. In some embodiments, each user is stored with basic information, an image, and a logon identifier and/or password and/or credential information associated with one or more other external source websites. In some embodiments, each user is stored with identifiers of other users at the platform with whom the user has a platform-recognized relationship (e.g., followers or other users that the user follows). In some embodiments, each user is stored with mappings (e.g., references) to the items (e.g., whose information is stored at items database 208) in which the user has indicated interest. In some embodiments, for each user, each mapping to an item that was indicated to be of interest to the user is given the same interest degree value (e.g., 1), such that it is assumed that the user enjoys each item equally. In some other embodiments, for each user, each mapping to an item that was indicated to be of interest to the user is associated with a weighted interest degree value that is input by the user on a given scale (e.g., given a scale of zero to one, a user can input a 1 for an item of interest that the user enjoys immensely and only 0.1 for another item of interest for which the user expresses relatively less interest). For example, the weighted interest degree values corresponding to items of interest for a first user may be used in determining other users with similar items of interest and also those other users with potentially similar degrees of interest in the overlapping items.

Figure 3:
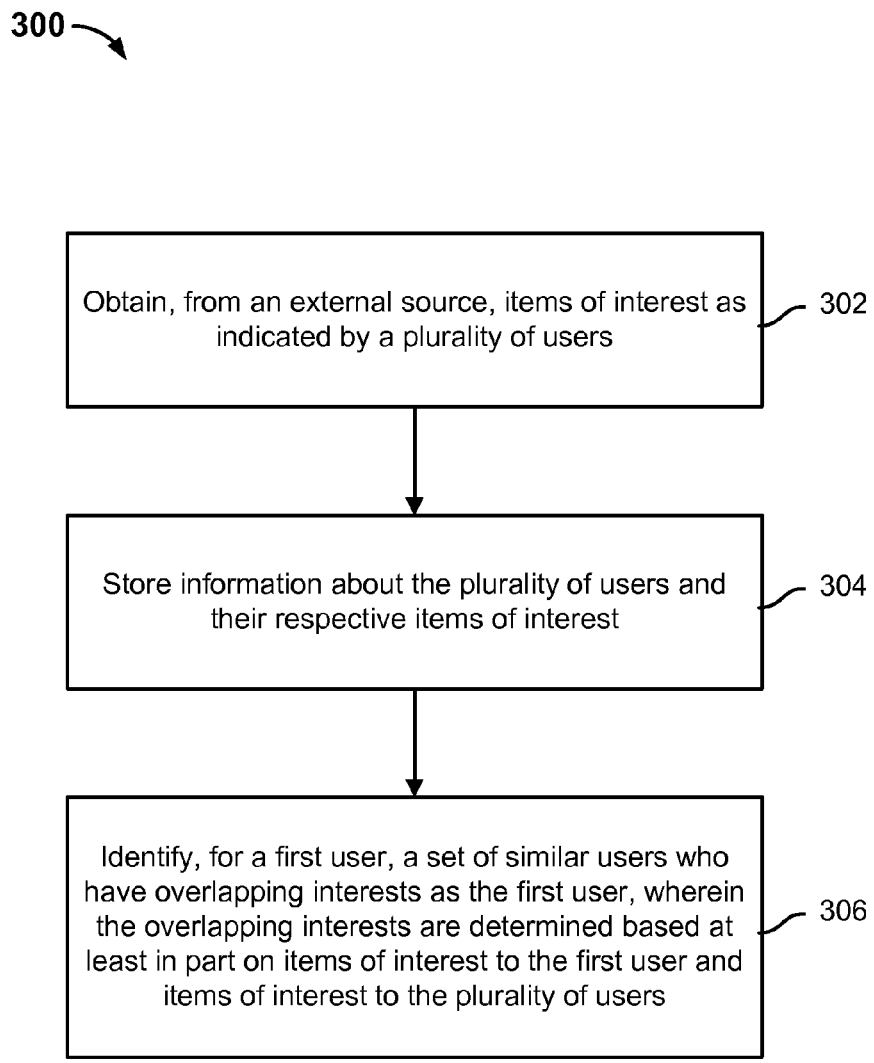
FIG. 3 is a flow diagram showing an embodiment of a process for matching users with similar interests.

FIG. 3 is a flow diagram showing an embodiment of a process for matching users with similar interests. In some embodiments, process 300 may be implemented at a system such as system 100.

At 302, items of interest as indicated by a plurality of users are obtained from an external source. In some embodiments, using a user's logon and credential information for respective one or more external sources (e.g., sources other than the platform that is importing the user's items of interest), the one or more external sources are accessed and items that were indicated by the user at the respective external sources are imported from each of the external sources. In some embodiments, deduplication is performed with respect to items imported for the same user across multiple external sources such that the same item that was indicated to be of interest to the user at two different external sources is imported only once or alternatively, both instances are imported but a reference is stored for the user to only instance of the item. Such importing of items of interests may be performed for each user at the platform for matching users with similar interests.

In some embodiments, periodically or in response to a trigger event (e.g., a user logging on to the platform), the one or more external sources are checked to determine whether the previously imported items of interest for the user need to be updated because, for example, the user has modified the items of interest at the external sources by adding new items or removing existing items of interest. In response to detecting modifications at the external sources, in some embodiments, the items of interest imported for the user are updated accordingly. For example, the items removed at the external source(s) from which they were imported are accordingly removed at the imported set of items for the user and new items added at the external source(s) are accordingly added to the imported set of items.

In some embodiments, a category is determined for each item of interest that is imported. In some embodiments, associated media (e.g., an image and/or summary) is obtained for each new item of interest if it is not already available at a database that is used to store imported items (e.g., items database 208). In some embodiments, logic associated with each specific external source is used to determine which items with which a user has interacted with (e.g., clicked on, watched, rated, purchased) is deemed as an item in which the user has an interest (as opposed to being an item that the user has interacted with but does not have much interest in). For example, such logic may dictate that any items at external source Facebook® that the user has "Liked" is an item of interest, any movies at external source Netflix® that the user has rated four stars and above is an item of interest, any iTunes® song that the user has rated four stars and above is an item of interest, any product at Amazon.com® that the user has rated four stars and above is an item of interest, etc.

At 304, information about the plurality of users and their respective items of interest are stored. In some embodiments, other than items of interest, basic information associated with each user is also imported for the user. For example, profile information (e.g., name, age, gender, location) associated with a user at one or more external sources may be imported also. In some embodiments, the imported items of interest are stored for the user. For example, the items imported for a user may be stored for the user at a database that is used to store imported user information (e.g., users database 210). In some embodiments, the imported basic information and the imported items of interest for a user comprise at least a portion of a user profile stored and presented at the platform.

By importing basic information and items of interest as indicated at external sources, the platform leverages the information already indicated by the users at various external sources to generate a profile with an aggregation of the imported information.

At 306, for a first user, a set of similar users who have overlapping interests as the first user is identified, wherein the overlapping interests are determined based at least in part on items of interest to the first user and items of interest to the plurality of users. In some embodiments, a user may request to find matching users that have at least some similar items of interest as the requesting user. In some embodiments, in a response to such a request, the items of interest of the requesting users are determined. Then, it is determined which other users have also indicated interest in at least some of the items of interest belonging to the requesting user. At least some of these other users (matching users) are ranked by the number of items of interest that they share with the requesting user and the identifiers of some of the highest ranking matching users, in some embodiments, are presented to the requesting user. The requesting user may then view the profiles of these others to discover other items that the requesting user may be interested in but has not indicated such. In some embodiments, the user may add an item of interest that was indicated by another user to be an item of interest for the first user.

In the examples of FIGS. 4-7, the platform matching users with similar interests is referred to as the Socialflavor platform. In the Socialflavor platform, an item of interest to a user is sometimes referred to as a "flavor."

Figure 4:
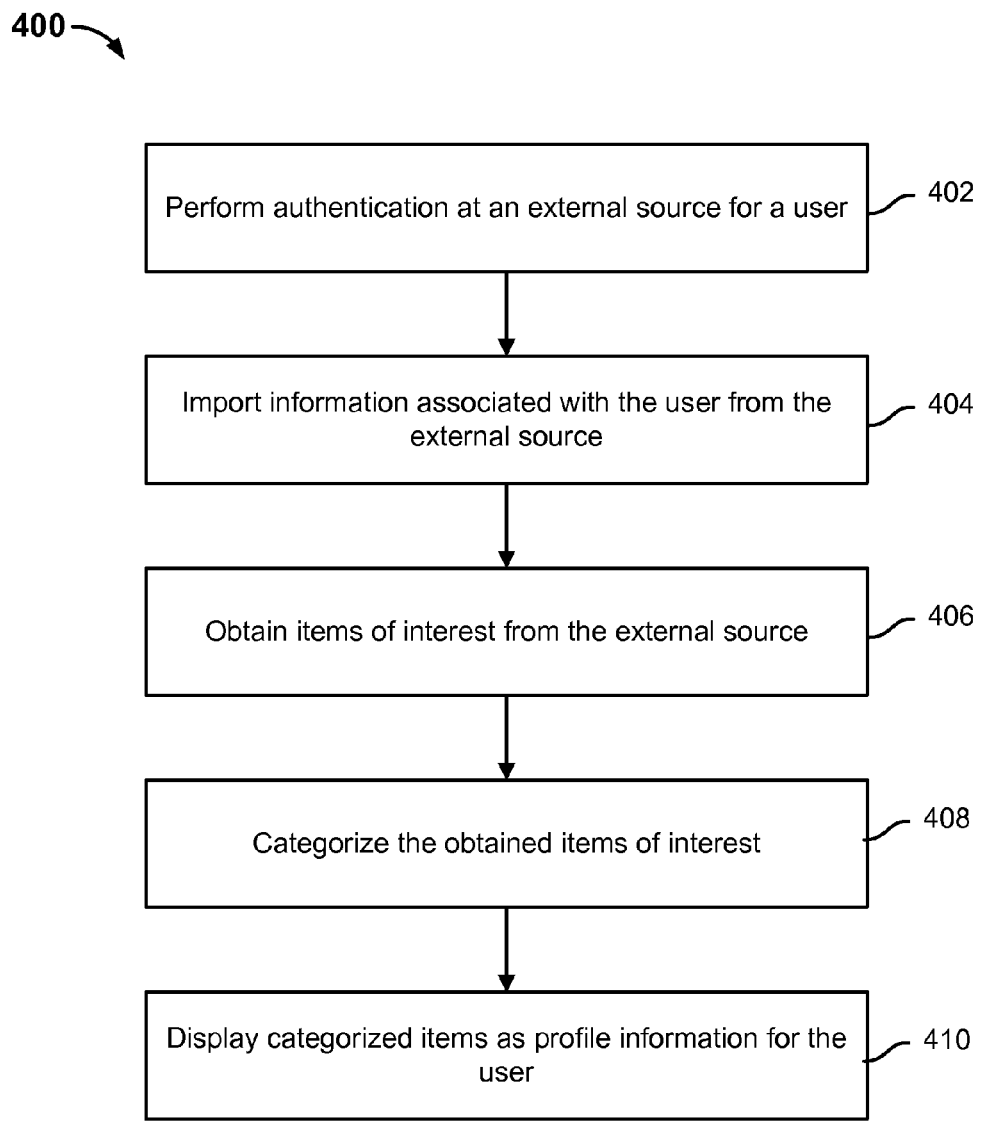
FIG. 4 is a flow diagram showing an embodiment of a process for importing items of interest from an external source.

FIG. 4 is a flow diagram showing an embodiment of a process for importing items of interest from an external source. In some embodiments, process 400 may be implemented at a system such as system 100. In some embodiments, process 400 may be used to implement 302 of process 300.

At 402, authentication is performed at an external source for a user. For example, the authentication is performed using the logon and credential information provided by the user. In this example, the external source is Facebook®.

At 404, information associated with the user from the external source is imported. For example, the user's basic information, such as full name and profile picture, is imported from the source website using an application programming interface (API) call such as Facebook® Graph API's function call for getting profile information. In some embodiments, optionally, the user may upload a profile picture on Socialflavor, which is then used in place of the profile picture imported from Facebook®.

At 406, items of interest are obtained from the external source. For example, the user's items of interest from the source website, which comprise Facebook® "Likes," are obtained. In some embodiments, this is accomplished by making an API call (such as Facebook Graph API's function call for getting the user's list of "Likes") to the source website. The source website returns data structures that include the respective titles, categories, and images associated with the items. In some embodiments, it is determined whether an imported item of interest has previously been imported (e.g., based on checking a database used to store imported items). In some embodiments, if the item has not been previously imported, then Socialflavor platform is optionally configured to identify the biggest or highest resolution image associated with each imported item on the source website, adjust the image (for example change the size of the image), and use the resulting image as the image for the imported item and/or search for a summary description at a third party website (e.g., Wikipedia®). If the item has been previously imported, then it is determined whether any associated media (e.g., an image and/or summary) has been stored for the item. If not, then an image and/or a summary associated with the item may be found at the external source and/or found at a third party website.

At 408, the imported items are categorized. In this example, the Socialflavor platform implements two levels of categorization, where top level categories such as "movies," "books," "music," "people," etc. are defined in the Socialflavor platform itself. There is also an optional "other" category that is a catch-all for items that are not easily categorizable. The lower level categories are categories defined by the source website. They may be categories that are specified by users of the source website, for example. In some embodiments, mappings between a number of top level categories and lower level categories are defined by Socialflavor's operators based on experience and knowledge. A lower level category may be mapped to multiple top level categories (for example, the "actor" category from Facebook® may map to both "movies" and "people" categories on Socialflavor.) To determine the category of an imported item, the imported category associated with the item is looked up in the mapping to determine which top level category the item belongs. If no mapping is found, a keyword matching is performed to identify the closest top level category. For example, an imported item may be associated with the category of "black and white films" on Facebook®, and a keyword matching would classify the item under the "movies" top level category on Socialflavor. If still no category is found after keyword matching, the item is placed under the "other" category.

At 410, the categorized items are displayed to the user as his/her profile information. At this point, an automatic profile population at the Socialflavor platform without requiring additional user input has been performed. In some embodiments, the process is repeated each time the user logs on to the Socialflavor platform, and if the user has made any updates on the external source website (such as indicated by more "Likes" on Facebook®), the changes are also imported and made on the Socialflavor platform.

FIG. 5 shows an example of items imported for a user. In this example, the display indicates the shown flavors are imported from the external source Facebook®, although flavors may be imported from other external sources in addition to or in place of Facebook®. For example, if the user has indicated that he liked a certain book on external source Facebook®, rated another book on external source Amazon®, and followed a third book on external source Twitter®, then, provided that the user gives permission to access the source websites, all three books are imported from their respective source websites and are displayed under the book category of the Socialflavor platform. The user can reorganize the display of the items at the Socialflavor. For example, the user can exclude certain items with which he no longer wishes to be associated.

Figure 6:
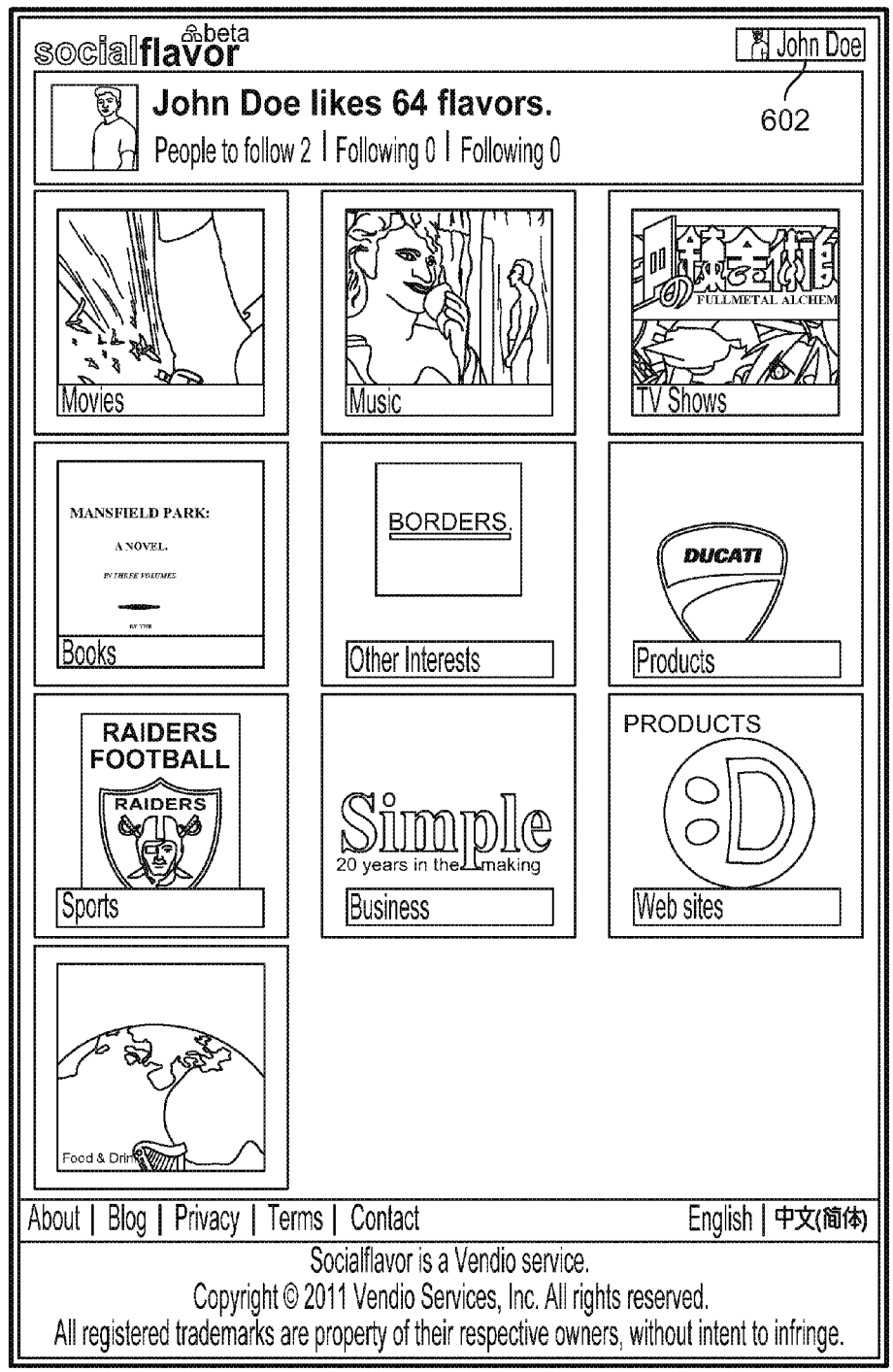
FIG. 6 shows an example of some items of interest imported for a user.
Figure 7:
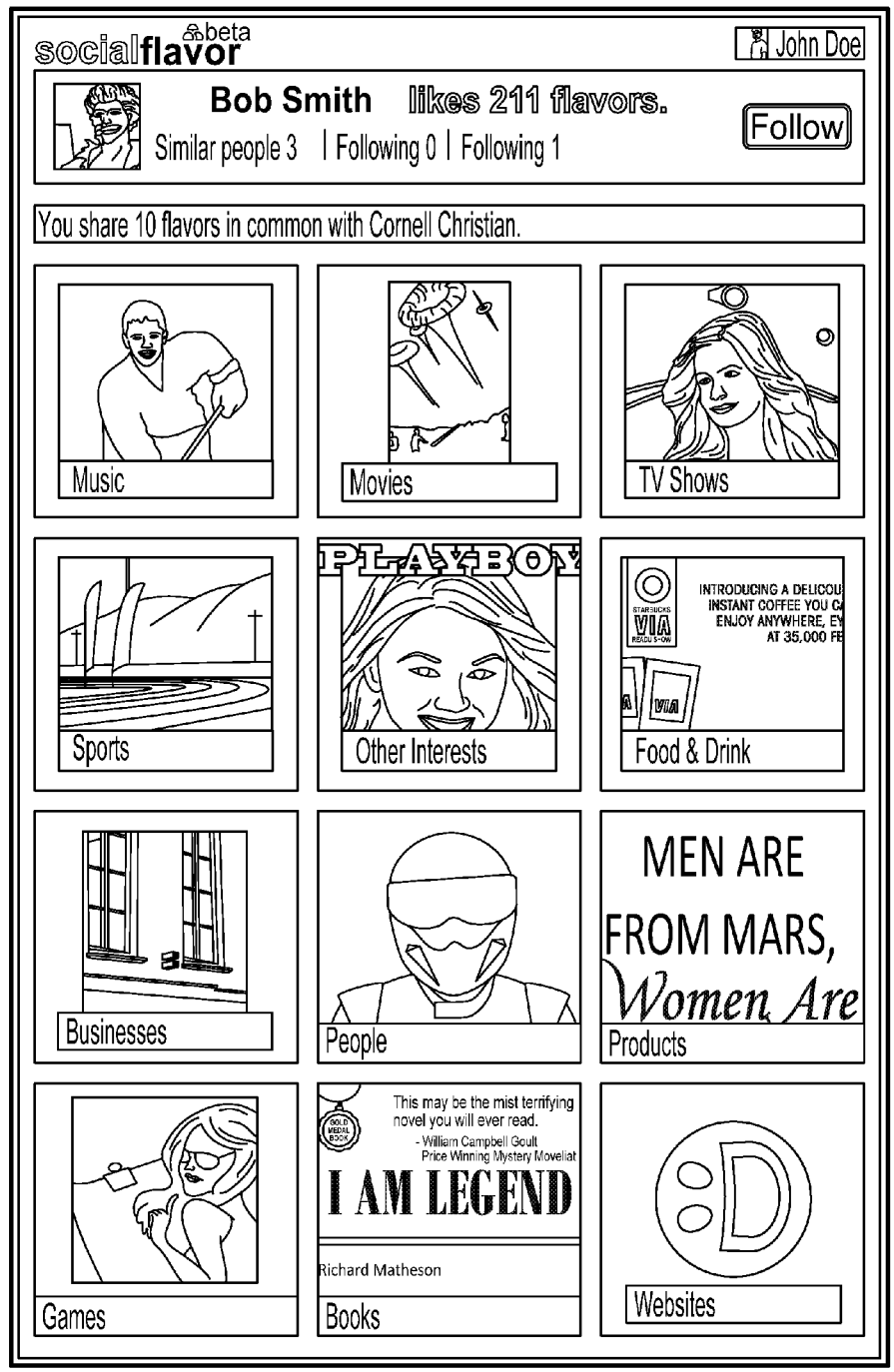
FIG. 7 shows an example of some items of interest imported for a user.

FIG. 6 shows an example of some items of interest imported for a user. In this example, the example of FIG. 6 shows one example display mode of the user's profile at Socialflavor. The name of the user currently logged on to the platform is identified at section 602 as "John Doe." Since "John Doe" is also the name of the user whose profile is being viewed, in FIG. 6, John is currently viewing his own profile. In this example the user's flavors are displayed as tiles. In some embodiments, when a flavor tile is selected, it is turned over visually, and summary information associated with the flavor is displayed. In some embodiments, the summary information and image used in the flavor tile are the associated media that is stored with the flavor.

In some embodiments, in response to a request by a user, at least some users in the system that have similar interests as this user are identified. For example, each time that a user logs on to the Socialflavor platform, a request to initiate such a matching process may be automatically issued for the user. Details of this matching process are described below. The other user or users that have the most overlapping flavors as this user are identified to this user (e.g., the other users are recommended to this user as people he or she should follow). In the example of FIG. 6, the result of the matching process has indicated to the user, John Doe, that there are 2 other users similar to him that he should follow (at the "People to follow" section at the top of the profile). John can select another user to follow by clicking on a link to the profile of the recommended other user to follow. In this example, John selects one of the recommended, similar users, Bob Smith, whose profile is displayed in FIG. 7. In Bob's profile, it is shown that there are three users (including John Doe) who are similar to him. The number of people Bob follows and is followed by are displayed at the top of Bob's profile. While viewing Bob's profile, John can browse Bob's flavor tiles, select flavors that appear interesting, and discover additional items that may be of interest.

In another aspect, the user's profile is dynamically updated in real time. In some cases, the update occurs when the user indicates on the Socialflavor platform that he is interested in some additional items. For example, while browsing through another user's profile, John comes across a movie he is interested in. He can express his interest by using a button or other user interface tool provided by the platform. In addition to visually reflecting the change by adding the flavor to John's profile, in some embodiments, the system in real time recomputes the matching information and identifies the top users who are most similar to John, given his updated profile of flavors. The number of matching flavors and the specific users with matching flavors may change for John. In the profile display, the number of people John should follow also changes accordingly. In addition, John's profile would also be added to the "similar people" list of the top users who are similar to him.

The following describes a technique for rapidly matching users with overlapping interest in the platform with large numbers of users, items of interest to the users, and links between the users and items of interest. The technique uses a streaming technique to progressively process data that may be continuously updated.

In some embodiments, when the user initially logs in to a user matching platform such as Socialflavor, the platform informs the user of privacy protection policy at the platform, obtains informed consent allowing the platform to collect and display personal data from the user, and processes the user's information only if the user gives consent.

In some embodiments, users database 210 of FIG. 2 may be implemented using at least the entries shown in this example. In this example, for each user in the system ("User 1," "User 2," "User 3," "User 4," etc.), items the user has indicated interest in the past (e.g., Facebook® "Likes," restaurants that the user favorably rated on Yelp®, products that the user has favorably rated at Amazon.com®, songs that the user has favorably rated at iTunes®, movies that the user has favorably rated at Netflix®, etc.) are imported through these external source websites using, for example, APIs provided by the websites, such as Facebook Connect. These items of interest (also referred to as flavors) are categorized and displayed. Two databases are constructed based on this information. The first database includes at least user-item relationships and the second database includes at least item-user relationships.

Figure 8:
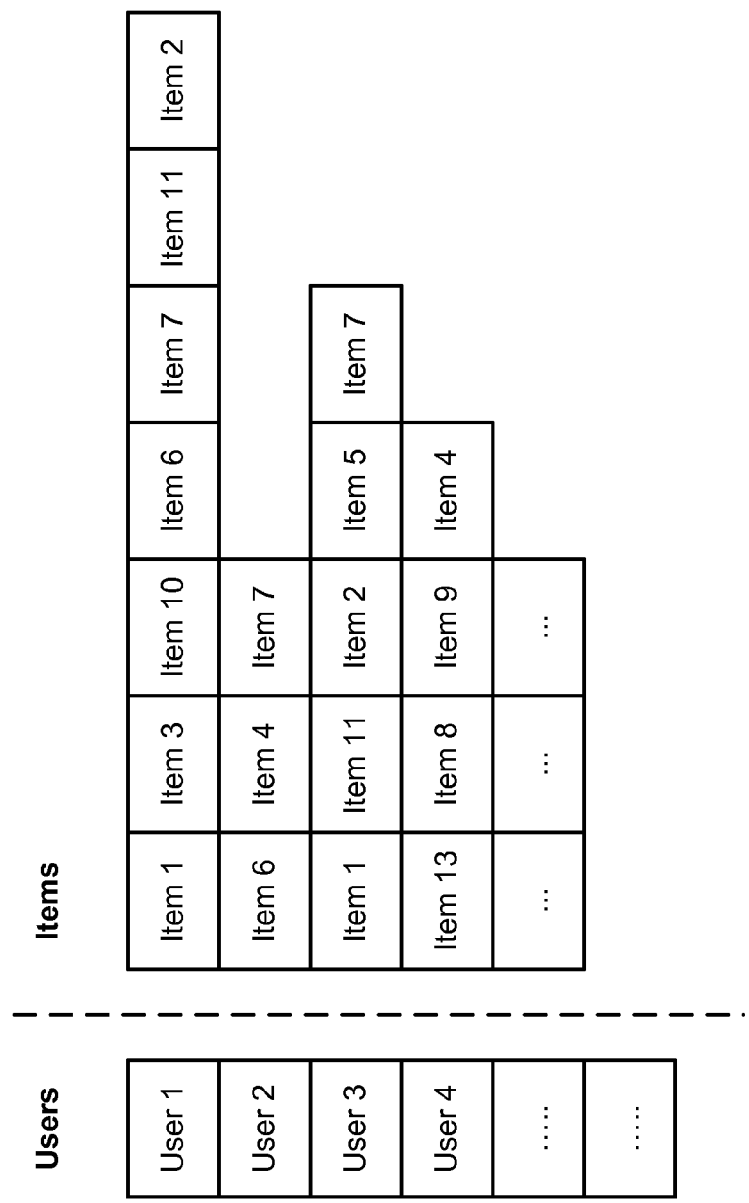
FIG. 8 is an example of a user-item database that maps each user to a list of items that the user has indicated interest.

FIG. 8 is an example of a user-item database that maps each user to a list of items that the user has indicated interest. In some embodiments, the user-item database is implemented with an items database such as users database 210 of server 200. In some embodiments, items in the interested items list are optionally ordered in descending order in which the user has indicated interest. In some embodiments, each item in the user-item database may be associated with one or more categories. In the example, User 1 maps to Item 1, Item 3, Item 10, and so on.

FIG. 9 is an example of an item-user database that maps each item to a list of users who have indicated interest in the item. In some embodiments, the item-user database is implemented with an items database such as items database 208 of server 200. In some embodiments, each item in the item-user database may be associated with one or more categories. For example, Item 1 maps to User 1 and User 3. Thus, in response to a matching request, for each item of interest to the requesting user, other users who are interested in the same item are looked up in the item-user database, and sorted according to the total number of overlapping items with the requesting user. For example, if User 1 issues a matching request (or alternatively, a matching request is issued on behalf of the user), then, in the simple example shown in FIG. 9, User 3 would have 3 overlapping items of interest (Items 1, 2, and 11) with User 1, and User 2 would have 1 overlapping item (Item 6) of interest with User 1. In some embodiments, the system presents the user(s) with the highest number(s) of overlapping items as users most similar to the first user, and allows the first user to explore other items the similar users are interested in.

In some embodiments, the system splits up the processing to handle large numbers of users and matching requests.

Figure 10:
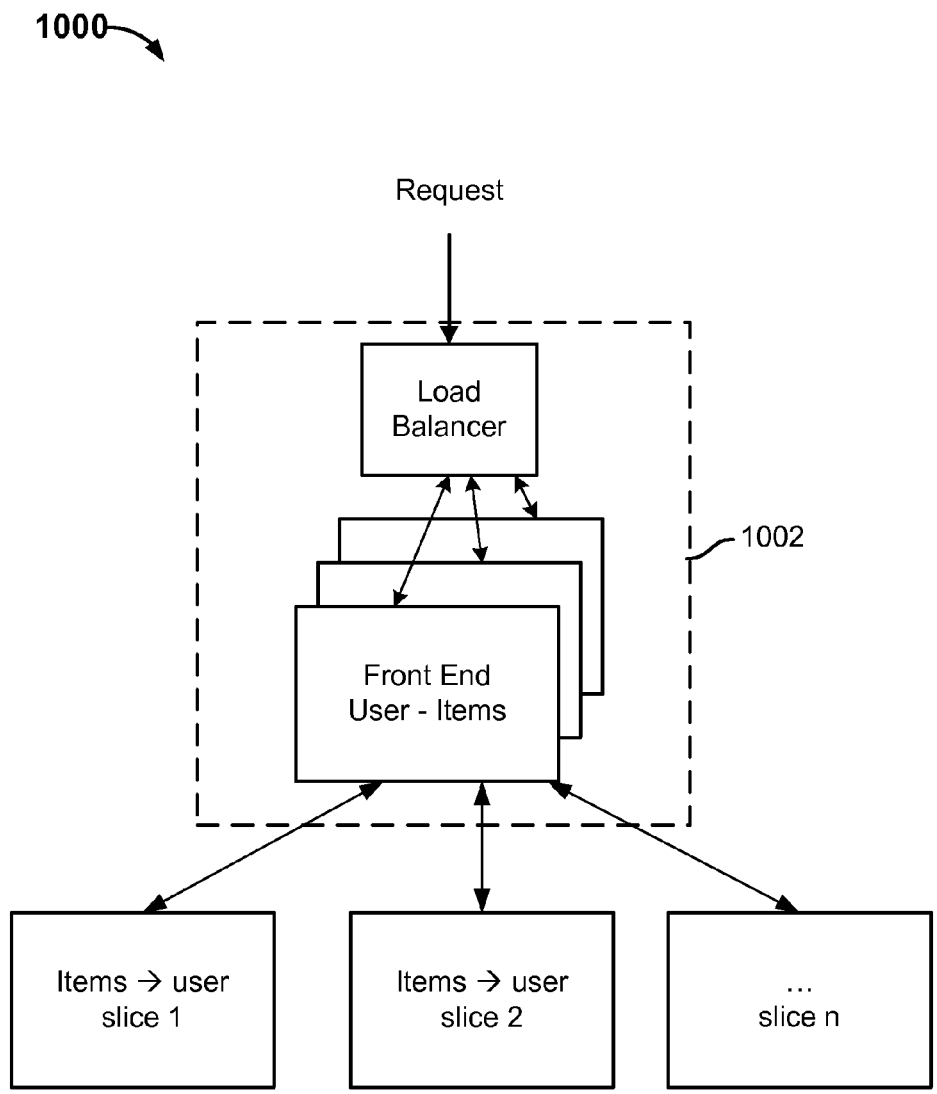
FIG. 10 is a diagram showing an embodiment of a hierarchical matching system that is highly scalable.

FIG. 10 is a diagram showing an embodiment of a hierarchical matching system that is highly scalable. In some embodiments, system 1000 may be used to implement a matching engine such as matching engine 206 of server 200. In this example, a load balancer, if used, may send the received matching request for a requesting user to front end server 1002. Front end server 1002 looks up the user and identifies in the user-item database (such as the example shown in FIG. 8) the list of items that the requesting user is interested in. The list of items is split into slices and each slice of the list is assigned to one of multiple back end processes (also referred to as slice processors), which are shown in the example as slice 1, slice 2, . . . and slice n. For example, if the list of items that the requesting user were interested in included Items 1, 4, 5, 6, 8, 34, 76, and 99, then the list may be split into a slice including Items 1, 4, 5, and 6 that is assigned to one slice processor and another slice including Items 8, 34, 76, and 99 that is assigned to another slice processor. In some embodiments, a hashing technique is used to split the list items into slices and/or to distribute the processing load. In some embodiments, the slice processors operate in parallel and perform at least some redundant functions. Each slice processor handles a subset of the slices, and returns presorted data to the front end. For example, each slice processor may process the same number of slices or a different number of slices.

In some embodiments, each slice processor is configured to process its subset of assigned slices by determining which other users have overlapping items as the requesting user (matching users) among the requesting user's items of interest in the subset of slices assigned to that slice processor. In some embodiments, each slice processor is configured to also sort these matching users based on each user's total count of overlapping items (e.g., where each overlapping item is represented by one count) as determined by that slice processor. By processing the subsets of the items of interest of a requesting user in parallel, the processing time for each request is reduced. Front end server 1002 merges the presorted data received from the slice processors, and identifiers corresponding to the matching users with the most number of overlapping items of interest as the requesting user (e.g., highest total counts) are returned.

Figure 11:
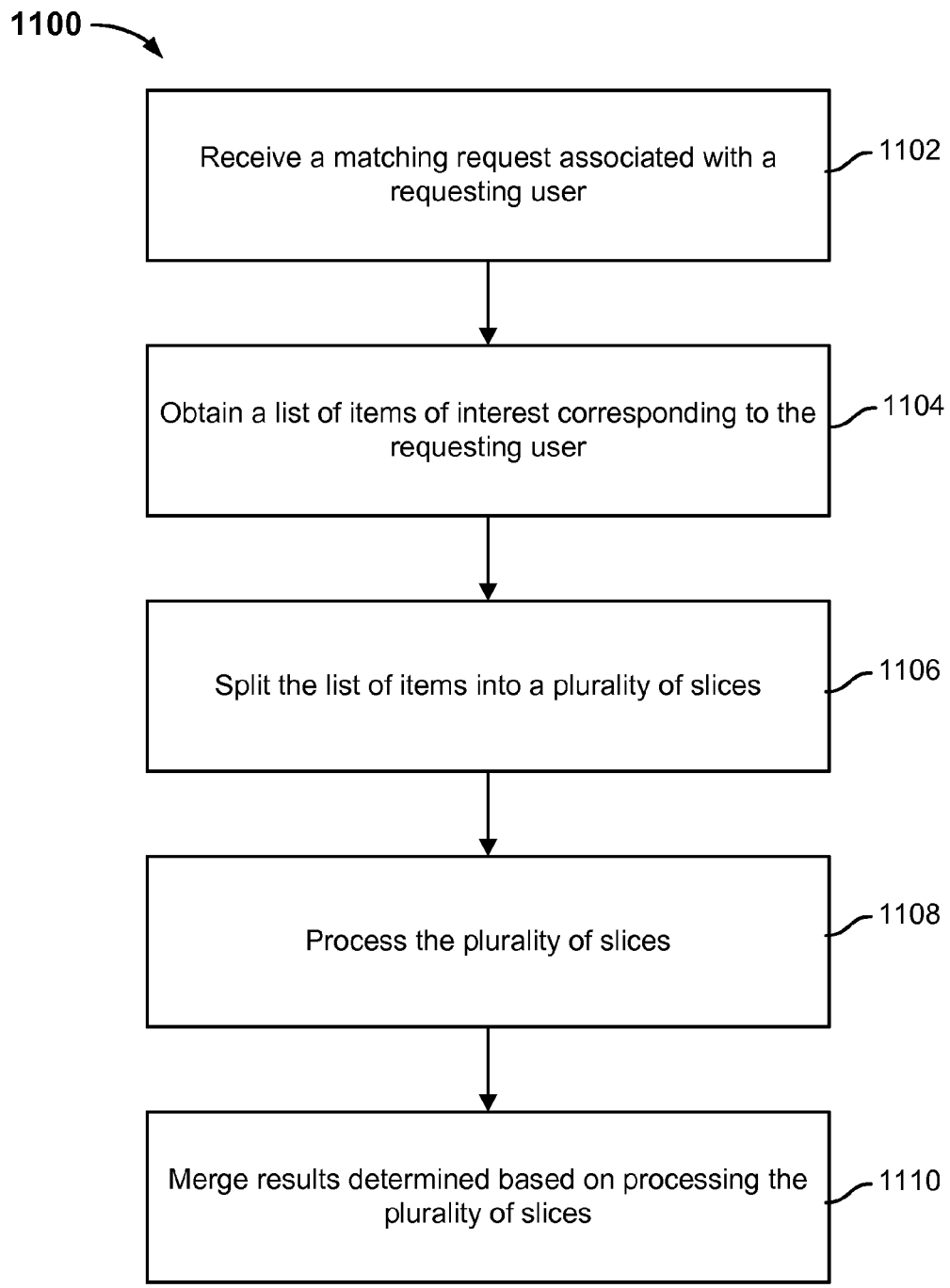
FIG. 11 is a flow diagram illustrating an embodiment of a matching process.

FIG. 11 is a flow diagram illustrating an embodiment of a matching process. At 1102, a matching request associated with a requesting user is received. For example, a matching request may be issued whenever the requesting user logs on to the platform for matching users with similar interests. For example, a matching request may seek to find users who are similar to User 3 as shown in the example of FIG. 8. At 1104, the corresponding list of items of interest corresponding to the requesting user is obtained. In this example, as shown in the example of FIG. 8, User 3 is interested in Items 1, 11, 2, 5, and 7. At 1106, the list of items is split into a plurality of slices. For example, the list of items is split into subsets, referred to as slices, which are assigned to one or more slice processors. For example, slice 1 may include items 1, 2, and 5, and slice 2 may include items 7 and 11.

At 1108, the plurality of slices is processed. In some embodiments, the subsets of the lists of items corresponding to the requesting user are processed at least partially in parallel across the one or more slice processors. In some embodiments, a slice is handled by counting the users that have an interest in each item of the slice, and excluding the user requesting the query, and returning a sorted list of these other users based on their respective counts of overlapping items that they share with the requesting user. For example, for slice 1, Item 1 corresponds to Users 1 and 3 (as shown in FIG. 9), thus Users 1 and 3's respective counts (which are initially set to 0) are incremented; Item 2 corresponds to Users 1 and 3, and Users 1 and 3's respective counts are incremented again; and Item 5 corresponds to User 3 and User 3's count is incremented again. Accordingly, User 1 has a count of 2 and User 3 has a count of 3. Since User 3 is the requesting user, he is excluded from the list, and the result that is returned includes User 1 with a count of 2. For slice 2, Item 7 corresponds to Users 2 and 3, Item 11 corresponds to Users 1 and 3. Accordingly, Users 1, 2, and 3's counts are 1, 1, and 2, respectively, and User 3 is excluded for being the requesting user. Thus, the result that is returned from processing the slices includes User 1 (count 3) and User 2 (count 1).

At 1110, results determined based on processing the plurality of slices are merged. In some embodiments, results include presorted data (e.g., a list of matching users sorted based on their respective counts) are returned from each of the slice processors and merged. In some embodiments, merging includes combining the presorted data from the one or more slice processors and determining via sorting which users have the most counts and are therefore the most similar to the requesting user. In the example, User 1 has a count of 3, and User 2 has a count of 1. Thus, User 1 is most similar to User 3, having 3 overlapping items of interest. User 2 is the second most similar to User 3, having 1 overlapping item of interest. In some embodiments, the matching request may include a particular number (e.g., as predetermined by a platform operator or input by a requesting user) of most similar users whose identifiers are to be returned to the requesting user such that for example, the requesting user may be informed of the three most similar users as him or her (e.g., that he or she should follow).

In some embodiments, matching requests are serviced even though users that exist in the system and their items of interest may be updated frequently. This is because the internal data store used to store the user-item and item-user relationships are designed using concurrently updatable lists. This pattern allows existing users to be running matching requests while parallel updates are being performed on the data, without requiring global read or write locks across the data. For example, if the matching process were implemented using Java, this is solved using ConcurrentSkipList objects. Internally, when a query is scanning across a large SkipList and a concurrent update occurs, the update occurs on a future version of the data that will eventually be atomically set as the live data set. Put in other words, when a matching request is in process and data needs to be concurrently updated, processing matching request will proceed based on the not yet updated data and the data will be updated once the matching request is completed. As a result, the platform is designed to work across noisy data; data that will be eventually consistent, but can be transiently inconsistent. In other words, while the data is never quite coherent, matching requests may still be serviced.

In some embodiments, generation counters are used to speed up change detection associated with items and/or users and may be used in performing matching requests for users. It is assumed that the platform is a read mostly network—e.g., a much larger fraction of read operations than update operations occur. Thus, each time the platform is updated, generation counter(s) associated with the item(s) and/or users that are updated are incremented (e.g., by one). For example, updates in the system may include when a new item of interest is added for a user, when an existing item of interest is removed for a user, and when a user starts to follow or stops following another user. For example, a user that exists in the system may be associated with a generation counter such that each time that the list of items of interest corresponding to that user is updated or each time a new platform-recognized relationship between the user and another user is updated or each time that another user with whom the user has a platform-recognized relationship is updated, the generation counter associated with the user is monotonically increased (e.g., by an increment of one). Also, for example, an item of interest that exists in the system may be associated with a generation counter such that each time a user adds or removes the item to his/her list of items of interest, the generation counter associated with the item is monotonically increased (e.g., by an increment of one). In some embodiments, when a matching request is being processed, a version of the state of the requesting user and the requesting user's list of items of interest may be determined based on the values of the corresponding generation counters and at least some of the sorted data may be cached with this version number. For example, the sorted data may include the sorted list of users having the most number of overlapping items of interest as a requesting user, each of the users other than the requesting user's associated number of overlapping items of interest as the requesting user, a user's corresponding list of items of interest, and/or an item's corresponding list of users that are interested in that item. Thus, in a subsequent matching request that includes a user and/or an item formerly included in the processing of a previous matching request, it is checked whether the version of the state of the requesting user and the requesting user's list of items of interest have changed since a previous matching request based on the values of the corresponding generation counters. If some values on the corresponding generation counters have changed, then at least some of the data to be used in processing the request needs to be recomputed. But if some values on the corresponding generation counters have not changed, then in some cases, some of the sorted data cached with the previous version of data may be used without needing to recompute data or at least without needing to recompute at least some of the data. In a simple example, in processing a matching request for user Alice, if cached data associated with a previous matching request processed for user Alice is available and it is determined that none of the generation counters have changed since the previous matching request, then the cached data may be retrieved to determine the most similar users to user Alice without needing to recompute such other users.

The following is an example of an implementation of an optimized technique of processing a matching request for a user in the system:

In the platform for matching users with similar interests, there can be a large number (millions or more) of users and items of users. Since the data is retrieved from the item-user tables at the back end and sent to the merge systems at the front end server (e.g., such as the front end server 1002), speedup can occur if this results data (e.g., matching users and their respective counts of overlapping items as the requesting user among each subset of processed slice data) is partially sorted by the back end slice processors. This allows the front end server's merging of the results to determine, at an earliest possible time, when it has sufficiently determined the most similar users to the requesting user to complete the matching request. For example, this partially sorted results data streamed from a particular slice processor is data associated with matching users sorted in a descending order by their respective counts of overlapping items of interest as the requesting user among the subset of the requesting user's items of interest that was processed by that slice processor. However, since matching users may be found in more than one of the back end slice processors because each slice processor determines matching users for only a subset of the requesting user's items of interest, the front end server cannot perform a pure merge sort of the top matching users. For example, User 1 may be found to be a matching user by a first slice processor based on having 9 overlapping items of interest among the subset of items processed by the first slice processor and User 1 may also be found to be a matching user by a second slice processor based on having 3 overlapping items of interest among the subset of items processed by the second slice processor, which means that a merge process will determine that User 1 must have at least (3+9=) 12 overlapping items with the requesting user. So, in some embodiments, the front end server must build a merge buffer to keep track of the data merged from the partially sorted data returned from the slice processors until it is determined that no additional results data returned from the slice processors can be encountered that will rearrange the merged data associated with the users that have the most number of overlapping items of interest as the requesting user. Put another way, in this implementation of the merging process, in some cases, it is possible to process less than all of the presorted data from the slice processors if it is determined after merging over one or more rounds of presorted data from the slice processors that the most similar users (users that have the most number of overlapping items of interest as the requesting user) have been found. For example, data may be streamed from each back end slice processor to an accumulator function at the front end server, all while the accumulator function accumulates users' (other than the requesting user's) total counts (i.e., number of overlapping items of interest as the requesting user) from all slice processors. When it is determined that each back end slice processor's additional data can no longer contribute to moving the result set comprising data associated with the most similar users, merging of the partially sorted data from the slice processors can be cut off early. For example, if the matching request seeks to find the top 3 most similar users, then once such top users are determined by the merge process, the merge process may end.

In this example, assume that a matching request seeks to find the N most similar users to the requesting user, where N is an integer greater than zero. In this implementation of the matching process, the basic rule by which to end the merge process because the top N most similar users have been found is if the additional streaming of presorted data from the one or more slice processors can no longer rearrange the top N users. In this implementation, the subsets of the list of the items of interest corresponding to the requesting user are processed by respective slice processors that each generates presorted data including a sorted list of matching users in descending order of counts (i.e., the number of overlapping items of interest as the requesting user). If merging of the presorted data generated by the slice processors occurred in a round robin manner, then in each round, the subsequent user and corresponding count (which together is referred to as a stream value) is taken from the presorted list generated by each slice processor and added to the merge buffer. The merge buffer includes entries corresponding to matching users and their respective accumulated (summed) counts as determined from values streamed from sorted lists of the slice processors up until the current round. Also, the entries of the merge buffer are sorted based on the respective accumulated counts. As such, entries associated with the top N positions in the merge buffer are occupied by the N matching users that are currently determined to be the most similar as the requesting user.

It is determined that the top N positions can no longer be rearranged by a subsequent round of streaming and merging values from the presorted lists generated by the slice processors by: 1) noting when a user's accumulated count is updated by values streamed from all possible slice processors (i.e., once stream values associated with the same user have been streamed from every slice processor, the accumulated count for that user can no longer be further updated) 2) keeping track of the largest stream value from any individual slice processor in the current round of streaming; 3) noting the accumulated count difference between users in adjacent positions in the merge buffer.

In this example, the merging process may cut off if one of the following criteria is met: 1) if the sum of the stream values from each slice processor in a subsequent round of streaming and merging is less than the gap between adjacent positions in the top N positions of the merge buffer (e.g., no combination of data from a subsequent round can rearrange the top positions of the merge buffer), then the merge process ends. Or, 2) if the accumulated counts of the top N most similar users have each been updated from each slice processor and the sum of stream values from each slice processor in a subsequent round of streaming and merging is less than the gap between the accumulated counts of the Nth and N+1th users in the merge buffer, then the merge process ends.

In this streaming example, four slice processors (Slice 1, Slice 2, Slice 3, and Slice 4) each generates a list of presorted matching users and their corresponding counts (stream values), where each list is ordered by count descending and user identifier (ID) ascending where more than one user shares the same count. The slice processors and their corresponding lists are in the following table, Table 1, where the user identifier and count is written in the form of UID:CountOfUID. Because, in this example, the processing occurs in a round robin merge fashion, each column of stream values associated with Slices 1, 2, 3, and 4 are added to the merge buffer per each round of streaming and merging. So each column is labeled with the round number in which the column's stream values will be merged. As will be shown in the example below, not every round of stream values needs to be necessarily processed in order to determine the top N most similar users.

TABLE 1

|  | Round 1 | Round 2 | Round 3 | Round 4 | Round 5 | Round 6 |
|---|---|---|---|---|---|---|
| Slice 1 | U1:10 | U3:2 | U17:2 | U18:1 | U22:1 | U23:1 |
| Slice 2 | U22:10 | U1:2 | U17:1 | U18:1 | U40:1 | n/a |
| Slice 3 | U23:5 | U1:1 | U18:1 | U17:1 | U52:1 | n/a |
| Slice 4 | U17:10 | U1:1 | U18:1 | U40:1 | U55:1 | U56:1 |

Assume that in this example, the matching request seeks the top 3 most similar users to the requesting user. The following tables show the updated merge buffers during each round of streaming and merging values from the presorted lists of data from the four slice processors. During each round, the subsequent stream value (e.g., the stream value from each subsequent column of Table 1) from each slice processor is merged into the merge buffer. For example, if a stream value from Slice 1 comprising UX:3 is merged into the merge buffer that includes an entry of UX:12, then the count of 3 from Slice 1's stream value will be added to the accumulated count of 12 for the entry of UX in the merge buffer and the updated entry of UX:15 will be moved to the appropriate sorted position within the merge buffer. However, if no entry previously existed for UX in the merge buffer, then UX:3 will be added as a new entry at the appropriate sorted position within the merge buffer. In the following tables, the format of entries in the merge buffer is UID:AccumulatedCount[set] where UID is the user identifier, AccumulatedCount is the current accumulated count of overlapping items for UID, and the [set] is a flag that indicates from which slice processor(s) stream values associated with this user have been encountered. For example, the notation of UX:15[1.3.] indicates that stream values associated with UX have been encountered on Slices 1 and 3 so far (but not yet from Slices 2 or 4) and that 15 is the accumulated count based on the stream values associated with UX from Slices 1 and 3.

Round 1:

| Received stream values | Updated Merge Buffer Positions | | | |
|---|---|---|---|---|
| U1:10 from Slice 1 | U1:10[1...] | | | |
| U22:10 from Slice 2 | U1:10[1...] | U22:10[.2..] | | |
| U23:5 from Slice 3 | U1:10[1...] | U22:10[.2..] | U23:5[..3.] | |
| U17:10 from Slice 4 | U1:10[1...] | U17:10[...4] | U22:10[.2..] | U23:5[..3.] |

Round 2:

| Received stream values | Updated Merge Buffer Positions | | | | |
|---|---|---|---|---|---|
| U3:2 from Slice 1 | U1:10[1...] | U17:10[...4] | U22:10[.2..] | U23:5[..3.] | U3:2[..3.] |
| U1:2 from Slice 2 | U1:12[12..] | U17:10[...4] | U22:10[.2..] | U23:5[..3.] | U3:2[..3.] |
| U1:1 from Slice 3 | U1:13[123.] | U17:10[...4] | U22:10[.2..] | U23:5[..3.] | U3:2[..3.] |
| U1:1 from Slice 4 | U1:14[1234] | U17:10[...4] | U22:10[.2..] | U23:5[..3.] | U3:2[..3.] |

Round 3:

| Received stream values | Updated Merge Buffer Positions | | | | | |
|---|---|---|---|---|---|---|
| U17:2 from Slice 1 | U1:14[1234] | U17:12[1..4] | U22:10[.2..] | U23:5[..3.] | U3:2[..3.] | |
| U17:1 from Slice 2 | U1:14[1234] | U17:13[12.4] | U22:10[.2..] | U23:5[..3.] | U3:2[..3.] | |
| U18:1 from Slice 3 | U1:14[1234] | U17:13[12.4] | U22:10[.2..] | U23:5[..3.] | U3:2[..3.] | U18:1[..3.] |
| U18:1 from Slice 4 | U1:14[1234] | U17:13[12.4] | U22:10[.2..] | U23:5[..3.] | U3:2[..3.] | U18:2[..34] |

After the completion of Round 3, based on the current state of the merge buffer, it appears that no additional round(s) of stream data can cause U23 or any users below U23 to be associated with an accumulated count great enough to displace any of the users at the top 3 positions (U1, U17, and U22) in the merge buffer, but a further round is needed to make sure that the users within the top 3 positions cannot be reordered. It can also be determined that the difference in accumulated counts between U1 and U17 is only 1 and that U17 may still have a stream value associated with a count of 1 or greater from Slice 3 that could at least tie the accumulated count of U17 to that of U1, so the merge processing proceeds to Round 4.

U22 and the accumulated count for U1 or U17) so the matching process is stopped because the 1) criterion for stopping a merging process early (that if the sum of the stream values from each slice processor in a subsequent round of streaming and merging is less than the gap between adjacent positions in the top N positions of the merge buffer) has been met. The top 3 most similar users to the requesting user are therefore determined to be User 1 with 14 overlapping items, User 17 with 14 overlapping items, and User 22 with 10 overlapping items and the merging process can end early (i.e., the matching process does not need to process stream values in Rounds 5 or later). For example, the identifiers associated with Users 1, 17, and 22 may be returned to the requesting user.

Round 4:

| Received stream values | Updated Merge Buffer Positions | | | | | | |
|---|---|---|---|---|---|---|---|
| U18:1 from Slice 1 | U1:14[1234] | U17:13[12.4] | U22:10[.2..] | U23:5[..3.] | U18:3[1.34] | U3:2[..3.] | |
| U18:1 from Slice 2 | U1:14[1234] | U17:13[12.4] | U22:10[.2..] | U23:5[..3.] | U18:4[1234] | U3:2[..3.] | |
| U17:1 from Slice 3 | U1:14[1234] | U17:14[1234] | U22:10[.2..] | U23:5[..3.] | U18:4[1234] | U3:2[..3.] | |
| U40:1 from Slice 4 | U1:14[1234] | U17:14[1234] | U22:10[.2..] | U23:5[..3.] | U18:4[1234] | U3:2[..3.] | U40:1[...4] |

Now that Round 4 is completed, even though U17 is now tied with U1 for the greatest accumulated count, since stream values associated with U1 and U17 are now obtained from all 4 slice processors and the gap between the accumulated count of either U1 and U17 to that of U22 is 4, the most that any subsequent rounds can do is add 3 to the accumulated count of U22 (because the current maximum value of any remaining stream values on Slices 1, 3 and 4 is each 1 which means the most additional count that U22 can obtain is 3, which is still less than difference between the current accumulated count of The other stream values sorted by the four slice processors that would have been processed in Rounds 5 or later (U22:1, U40:1, U52:1, U55:1, U23:1, and U56:1) may also be cached and processed later (e.g., in the event that the users requests to find the top 4 most similar users in a future matching request).

The following is a set of example code that may be used to implement the optimized matching process as described above:

```
// do short cut optimization of the merging process to see if the process can
be terminated early
```

```
        if (type == MergeType.SHORTCUT_1) {
            // can any of the top N positions in the merge buffer be rearranged by
the remaining stream values from the slice processors?
            Iterator<MergeBuffer> iMerge = merge.iterator( );
            int previousCount = Integer.MAX_VALUE;
            moreWorkToDo = false;
            for (int topN = 0; topN < size + 1 && iMerge.hasNext( ); topN++) {
                MergeBuffer currentBuffer = iMerge.next( );
                // best case, how much can any entry in our buffer possibly move
                ahead
                int bestCaseJump = 0;
for (int i = currentBuffer.getSet( ).nextClearBit(0); i < queues.size( ); i =
currentBuffer.getSet( ).nextClearBit(i + 1)) {
                    bestCaseJump += lastValue[i];
                }
                // can we move far enough ahead to bump previous count (i.e., is the
best case bump if we process the next round enough to displace any users from the top N
positions in the merge buffer)?
                if (LOGGER.isTraceEnabled( )) {
                    LOGGER.trace(String.format("SHORTCUT_1 step[%d]:
previous[%d] current[%d] bestCase[%d]", topN, previousCount, currentBuffer.getItem( )
                        .getCount( ), bestCaseJump));
                }
                if (currentBuffer.getItem( ).getCount( ) + bestCaseJump >
previousCount) {
                    moreWorkToDo = true;
                    break;
                }
                previousCount = currentBuffer.getItem( ).getCount( );
            }
        }
    }
```

A technique of matching users of similar interests has been described. In various embodiments, the platform for matching users of similar interests is flexible so as to be capable of interacting with one or more different external sources. In various embodiments, the platform is dynamic so as to be adaptable to changes made at the various external sources. In various embodiments, the platform is scalable so as to be able to accommodate a large number of users and items maintained by the platform and to efficiently match similar users based on their respective items of interest.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system of matching users with similar interests, comprising:
one or more processors configured to:
aggregate, from a plurality of external sources that are respectively associated with different web servers with which one or more users are registered, items of interest as indicated by a plurality of users, wherein the items of interest are respectively indicated by a plurality of users based at least in part on an indication that is input to a corresponding web site, wherein inputting the indication is different from consuming content associated with the corresponding item, wherein to aggregate includes to aggregate from a first external source of the plurality of external sources items of interest as indicated by a first user of the plurality of users, wherein to aggregate from the first external source includes to:
receive a set of credentials input by the first user for the first external source;
perform authentication at the first external source using the set of credentials input by the first user for the first external source; and
store items of interest corresponding to the first user by obtaining from the first external source items of interest as indicated by the first user at the first external source, wherein to store the items of interest corresponding to the first user by obtaining from the first external source items of interest as indicated by the first user at the first external source includes to deduplicate an item of interest corresponding to the first user obtained from the first external source with a redundant item of interest corresponding to the first user obtained from a second external source, wherein to deduplicate the item of interest corresponding to the first user obtained from the first external source with the redundant item of interest corresponding to the first user obtained from the second external source includes to create one entry based at least in part on the item of interest corresponding to the first user obtained from the first external source or the redundant item of interest corresponding to the first user obtained from the second external source;
store information about the plurality of users and their respective items of interest; and
identify, for the first user, a set of similar users who have overlapping interests as the first user, wherein the overlapping interests are determined based at least in part on the stored items of interest corresponding to the first user and stored items of interest corresponding to the plurality of users, wherein a weighted score is determined for the first user based the first user's social credibility, wherein the weighted scored is based at least in part on whether the first user submitted the indication within a threshold period of time, a frequency of submissions of indications by the first user and an endorsement of another user; and
one or more memories coupled to the one or more processors and configured to provide instructions to the one or more processors.

2. The system of claim 1, wherein to aggregate from the first external source includes to import user information associated with the first user stored at the first external source.

3. The system of claim 2, wherein the imported information includes information input by the first user at the first external source.

4. The system of claim 2, wherein the one or more processors are further configured to assign a category to each obtained item of interest and to display categorized items as profile information for the first user.

5. The system of claim 1, wherein the one or more processors are further configured to update items of interest as indicated by the plurality of users based on a detected change at the first external source.

6. The system of claim 1, wherein to store information about the plurality of users and their respective items of interest includes storing basic information and corresponding obtained items of interest for the first user of the plurality of users.

7. The system of claim 1, wherein the one or more processors are further configured to indicate to the first user the set of similar users.

8. The system of claim 1, wherein the stored items of interest corresponding to the first user comprise items that the first user had indicated a preference or favorable feedback for at the first external source.

9. The system of claim 1, wherein to identify, for the first user, the set of similar users who have overlapping interests as the first user includes to:
obtain a list of items of interest corresponding to the first user;
split the list of items into a plurality of slices;
process the plurality of slices; and
merge results determined based on processing the plurality of slices.

10. The system of claim 9, wherein to process the plurality of slices includes to assign the plurality of slices to a plurality of slice processors, wherein each of the plurality of slice processors generates a sorted list of stream values, wherein each stream value comprises a matching user to the first user and the matching user's count of overlapping items with the first user among items included in one or more slices assigned to that slice processor.

11. The system of claim 9, wherein to merge results determined based on processing the plurality of slices includes merging stream values from presorted lists of stream values generated by a plurality of slice processors based at least in part on processing the plurality of slices.

12. The system of claim 11, wherein merging stream values from presorted lists includes performing merging stream values over one or more rounds, wherein performing each round includes adding a subsequent stream value from each of the presorted lists into a merge buffer and sorting entries within the merge buffer associated with matching users and the matching users' corresponding accumulated counts of overlapping items with the first user.

13. The system of claim 12, wherein performing merging stream values stops when a criterion associated with stopping is met.

14. The system of claim 13, wherein subsequent to stopping the performance of merging stream values, one or more matching users at one or more top positions of the merge buffer comprise the set of similar users.

15. A method of matching users with similar interests, comprising:
aggregating, using one or more processors that are respectively associated with different web servers with which one or more users are registered, from a plurality of external sources, items of interest as indicated by a plurality of users, wherein aggregating includes aggregating from a first external source of the plurality of external sources items of interest as indicated by a first user of the plurality of users, wherein the items of interest are respectively indicated by a plurality of users based at least in part on an indication that is input to a corresponding web site, wherein inputting the indication is different from consuming content associated with the corresponding item, wherein aggregating from the first external source includes:
receiving a set of credentials input by the first user for the first external source;
performing authentication at the first external source using the set of credentials input by the first user for the first external source; and
storing items of interest corresponding to the first user by obtaining from the first external source items of interest as indicated by the first user at the first external source; storing information about the plurality of users and their respective items of interest, wherein storing the items of interest corresponding to the first user by obtaining from the first external source items of interest as indicated by the first user at the first external source comprises deduplicating an item of interest corresponding to the first user obtained from the first external source with a redundant item of interest corresponding to the first user obtained from a second external source, wherein deduplicating the item of interest corresponding to the first user obtained from the first external source with the redundant item of interest corresponding to the first user obtained from the second external source includes creating one entry based at least in part on the item of interest corresponding to the first user obtained from the first external source or the redundant item of interest corresponding to the first user obtained from the second external source; and
identifying, for the first user, a set of similar users who have overlapping interests as the first user, wherein the overlapping interests are determined based at least in part on the stored items of interest corresponding to the first user and items of interest corresponding to the plurality of users, wherein a weighted score is determined for the first user based the first user's social credibility, wherein the weighted scored is based at least in part on whether the first user submitted the indication within a threshold period of time, a frequency of submissions of indications by the first user and an endorsement of another user.

16. The method of claim 15, wherein aggregating from the first external source includes importing user information associated with the first user stored at the first external source.

17. The method of claim 15, wherein storing information about the plurality of users and their respective items of interest includes storing basic information and corresponding obtained items of interest for the first user of the plurality of users.

18. The method of claim 15, further comprising indicating to the first user the set of similar users.

19. The method of claim 15, wherein the stored items of interest corresponding to the first user comprise items that the first user had indicated a preference or favorable feedback for at the first external source.

20. The method of claim 15, wherein identifying, for the first user, the set of similar users who have overlapping interests as the first user includes:
   obtaining a list of items of interest corresponding to the first user;
   splitting the list of items into a plurality of slices;
   processing the plurality of slices; and
   merging results determined based on processing the plurality of slices.

21. A computer program product for matching users with similar interests, the computer program product being embodied in a non-transitory computer readable storage medium and comprising computer instructions for:
   aggregating, from a plurality of external sources that are respectively associated with web servers with which one or more users are registered, items of interest as indicated by a plurality of users, wherein aggregating includes aggregating from a first external source of the plurality of external sources items of interest as indicated by a first user of the plurality of users, wherein the items of interest are respectively indicated by a plurality of users based at least in part on an indication that is input to a corresponding web site, wherein inputting the indication is different from consuming content associated with the corresponding item, wherein aggregating from the first external source includes:
      receiving a set of credentials input by the first user for the first external source;
      performing authentication at the first external source using the set of credentials input by the first user for the first external source; and
      storing items of interest corresponding to the first user by obtaining from the first external source items of interest as indicated by the first user at the first external source, wherein storing the items of interest corresponding to the first user by obtaining from the first external source items of interest as indicated by the first user at the first external source comprises deduplicating an item of interest corresponding to the first user obtained from the first external source with a redundant item of interest corresponding to the first user obtained from a second external source, wherein deduplicating the item of interest corresponding to the first user obtained from the first external source with the redundant item of interest corresponding to the first user obtained from the second external source includes creating one entry based at least in part on the item of interest corresponding to the first user obtained from the first external source or the redundant item of interest corresponding to the first user obtained from the second external source; storing information about the plurality of users and their respective items of interest; and
   identifying, for the first user, a set of similar users who have overlapping interests as the first user, wherein the overlapping interests are determined based at least in part on the stored items of interest corresponding to the first user and items of interest corresponding to the plurality of users, wherein a weighted score is determined for the first user based the first user's social credibility wherein the weighted scored is based at least in part on whether the first user submitted the indication within a threshold period of time, a frequency of submissions of indications by the first user and an endorsement of another user.

* * * * *

UNITED STATES PATENT AND TRADEMARK OFFICE
CERTIFICATE OF CORRECTION

| | |
|---|---|
| PATENT NO. | : 9,208,471 B2 |
| APPLICATION NO. | : 13/529878 |
| DATED | : December 8, 2015 |
| INVENTOR(S) | : Cross et al. |

Page 1 of 1

It is certified that error appears in the above-identified patent and that said Letters Patent is hereby corrected as shown below:

In the claims
Column 20, Line 65, claim 1, delete "wherein the weighted scored is" and insert -- wherein the weighted score is -- therefor.
Column 22, Line 54, claim 15, delete "the weighted scored is" and insert -- the weighted score is -- therefor.
Column 24, Line 30, claim 21, delete "the weighted scored is" and insert -- the weighted score is -- therefor.

Signed and Sealed this
Twenty-first Day of June, 2016

Michelle K. Lee
*Director of the United States Patent and Trademark Office*